United States Patent Office 3,405,133
Patented Oct. 8, 1968

3,405,133
PHTHALOCYANINE DYESTUFFS
Victor David Poole, Manchester, England, assignor to Imperial Chemical Industries Limited, London, England, a corporation of Great Britain
No Drawing. Filed Mar. 10, 1966, Ser. No. 533,241
Claims priority, application Great Britain, Mar. 18, 1965, 11,564/65
2 Claims. (Cl. 260—249.5)

This invention relates to phthalocyanine dyestuffs and more particularly it relates to phthalocyanine dyestuffs which are valuable for colouring textile materials, in particular cellulose textile materials.

According to the invention there are provided the phthalocyanine dyestuffs which, in the form of the free acids, are represented by the formula:

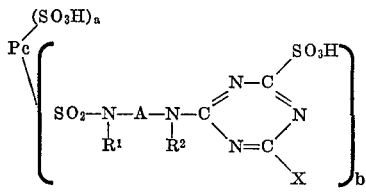

wherein Pc represents the copper phthalocyanine radical, $R^1$ and $R^2$ each independently represent hydrogen atoms or alkyl or hydroxyalkyl radicals, A represents an alkylene radical, X represents a sulphonic acid, alkoxy, aryloxy or substituted or unsubstituted amino group, $a$ represents a value of from 0 to 2 and $b$ represents a value of from 1 to 4 provided that the sum of $a$ and $b$ does not exceed 4.

The alkylene radicals represented by A are preferably lower alkylene radicals, that is to say alkylene radicals containing from 1 to 6 carbon atoms; and as examples of such alkylene radicals there may be mentioned methylene, trimethylene, propylene, tetramethylene and, above all, ethylene radicals.

The alkyl and hydroxyalkyl radicals represented by $R^1$ and $R^2$ are preferably lower alkyl and hydroxy lower alkyl radicals wherein lower alkyl denotes radicals containing from 1 to 4 carbon atoms. As specific examples of the radicals represented by $R^1$ and $R^2$ there may be mentioned methyl, ethyl, propyl, butyl, β-hydroxyethyl and β- or γ-hydroxypropyl radicals.

The alkoxy radicals represented by X are preferably lower alkoxy radicals containing from 1 to 4 carbon atoms; and as examples of such radicals there may be mentioned propoxy, ethoxy and, above all, methoxy radicals. The aryloxy radicals represented by X are preferably phenoxy radicals which may contain substituents other than sulphonic acid groups; and as examples of such radicals there may be mentioned chlorophenoxy, methoxyphenoxy and methylphenoxy groups. The substituted amino groups represented by X can be lower alkylamino groups such as methylamino, ethylamino, dimethylamino and diethylamino groups or substituted lower alkylamino groups such as β-cyanoethylamino and di(β-cyanoethyl)amino groups, hydroxy lower alkylamino groups such as β-hydroxyethylamino and di(β-hydroxyethyl)amino groups, cyclohexylamino, morpholino and piperidino groups, and arylamino groups such as anilino, N-methylanilino and naphthylamino groups which may contain substituents other than sulphonic acid groups, for example chlorine atoms or methyl or methoxy groups. It is however preferred that X represents the methoxy radical.

Each of the sulphonic acid and substituted sulphonamide groups present in the phthalocyanine dyestuffs of the invention is directly attached to a carbon atom which is in the 3- or 4-position of the benz rings present in the copper phthalocyanine radical represented by Pc.

The values or $a$ and $b$ represent the average values of the numbers of sulphonic acid and substituted sulphonamide groups respectively which are present in the phthalocyanine dyestuffs of the invention.

According to a further feature of the invention there is provided a process for the manufacture of the phthalocyanine dyestuffs, as hereinbefore defined, which comprises treating with a salt of sulphurous acid a phthalocyanine compound which, in the form of the free acid, is represented by the formula:

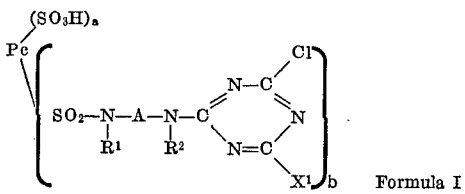

Formula I wherein Pc, A, $R^1$, $R^2$, $a$ and $b$ have the meanings stated above, and $X^1$ represents a chlorine atom or an alkoxy, aryloxy or substituted or unsubstituted amino group.

The process of the invention can be conveniently brought about by stirring the phthalocyanine compound and the salt of sulphurous acid (such as sodium sulphite or potassium sulphite) together in aqueous medium, preferably at a temperature between 10° and 100° C., and subsequently isolating the resulting dyestuff by conventional methods. In order to facilitate the reaction it is often advantageous to add a small amount of a tertiary amine, such as trimethylamine, pyridine, 1:4-diazabicyclo-(2:2:2)-octane, sodium nicotinate or 4:4'-bipyridyl to the reaction medium. The reaction medium may also contain solubilizing agents such as urea or dimethylformamide.

If desired the phthalocyanine dyestuffs of the invention can be isolated and/or dried in the presence of a buffering agent giving a pH (in aqueous solution) of 6 to 8, and as examples of such agents there may be mentioned mixtures of disodium hydrogen phosphate and potassium dihydrogen phosphate.

The phthalocyanine compounds of Formula I may themselves be obtained by reacting a phthalocyanine compound of the formula:

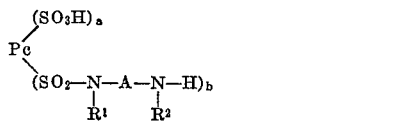

Formula II wherein Pc, A, $R^1$, $R^2$, $a$ and $b$ have the meanings stated with $b$ molecular proportions of a 1:3:5-triazine of the formula:

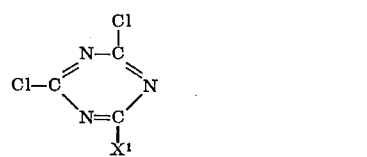

Formula III wherein $X^1$ has the meaning stated above, or with $b$ molecular proportions of cyanuric chloride and subsequently converting one of the two remaining chlorine atoms attached to each of the triazine rings to the required substituted or unsubstituted amino group by reaction with ammonia or the appropirate amine.

As specific examples of the said 1:3:5-triazines of Formula III there may be mentioned cyanuric chloride, 2:4-dichloro-6-methoxy-1:3:5-triazine, 2:4-dichloro - 6 - phenoxy-1:3:5-triazine and 2:4-dichloro-6-anilino-1:3:5-triazine.

The phthalocyanine compounds of Formula II may themselves be obtained by reacting, in aqueous medium, a copper phthalocyanine sulphonchloride of the formula:

Formula IV wherein Pc, $a$ and $b$ have the meanings stated, with a diamine of the formula:

$$H-N-A-N-H$$
$$\phantom{H-N}|\phantom{-A-}|\phantom{N-H}$$
$$\phantom{H-N-}R^1\phantom{-}R^2$$

Formula V wherein A, $R^1$ and $R^2$ have the meanings stated, and if the copper phthalocyanine sulphonchloride contains less than the number of sulphonic acid groups required in the compound of Formula II, hydrolysing those sulphonchloride groups which have not been reacted with the diamine to sulphonic acid groups.

The copper phthalocyanine sulphonchlorides of Formula IV may themselves be obtained by treating with chlorosulphonic acid copper phthalocyanine or a copper phthalocyanine containing from 1 to 4 sulphonic acid groups.

As specific examples of the diamines of Formula V there may be mentioned ethylenediamine, 1:3-propylenediamine, N-methylethylenediamine, N:N'-dimethylethylenediamine and N-($\beta$-hydroxyethyl)ethylenediamine.

When the compound of Formula V is an unsymmetrical diamine (i.e. $R^1$ and $R^2$ do not have the same value) then the resulting phthalocyanine compound of Formula II may consist of a mixture of the two compounds of the formulae

Such a mixture when reacted with the triazine of Formula III will yield a mixture of phthalocyanine compounds of Formula I which when treated with a salt of sulphurous acid will give a mixture of phthalocyanine dyestuffs of the invention which, in the form of free acids, are represented by the formulae:

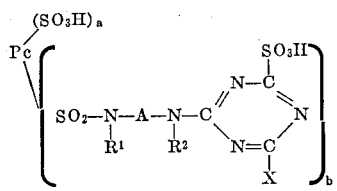

and

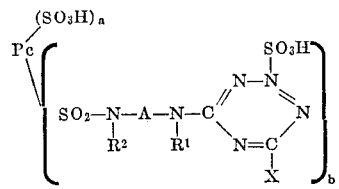

wherein Pc, $R^1$, $R^2$, A, X, $a$ and $b$ have the meanings stated.

One preferred class of the phthalocyanine dyestuffs of the invention comprises the phthalocyanine dyestuffs which, in the form of the free acids, are represented by the formula:

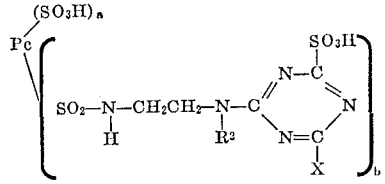

wherein Pc, $R^2$, X, $a$ and $b$ have the meanings stated.

In this class it is preferred that X represents the methoxy radical. It is further preferred that $R^2$ represents the $\beta$-hydroxyethyl radical.

The phthalocyanine dyestuffs, as hereinbefore defined, are valuable for colouring textile materials such as woollen textile materials, but more especially cellulose textile materials such as cotton, linen and viscose rayon. The said dyestuffs are preferably applied to cellulose textile materials in conjunction with a treatment with an acid binding agent, such as sodium carbonate, sodium hydroxide or trisodium phosphate, which can be applied before, during or after the application of the dyestuffs; or there may be used substances, such as sodium bicarbonate or sodium trichloroacetate, which on heating or steaming liberate an acid-binding agent.

The said dyestuffs can be applied to cellulose textile materials by any of the methods which are commonly used for the application of reactive dyestuffs. When so applied to cellulose textile materials the said phthalocyanine dyestuffs give bright greenish blue colourations which possess excellent fastness to light and to wet treatments particularly in respect of staining of any white textile materials present during the wet treatments. The said phthalocyanine dyestuffs have very high fixation on cellulose textile materials, so that little or none unreacted, and hence hydrolysed, dyestuff remains in the textile material, and accordingly prolonged washing off treatments to remove such loose dyestuff at the conclusion of the dyeing or printing processes are not required.

The invention is illustrated but not limited by the following examples in which the parts and percentages are by weight.

Example 1

A mixture of 18.0 parts of 2:4-dichloro-6-methoxy-1:3:5-triazine, 40.5 parts of copper phthalocyanine 3-{sulphon-N-[$\beta$-($\beta'$-hydroxyethylamino)-ethyl]amide}$_{2.4}$, 180 parts of urea and 700 parts of water is stirred for 1½ hours at 35° to 40° C. while a 4% aqueous solution of sodium hydroxide is gradually added to maintain the pH of the mixture between 6 and 7. The precipitated solid is then filtered off and washing with a 10% aqueous solution of sodium chloride.

The resulting solid is then stirred in 400 parts of water, 50 parts of sodium sulphite crystals and 4 parts of pyridine are added, and the mixture is stirred for 4 hours at 65° C. The mixture is then cooled to 20° C., a solution of 7 parts of sodium dihydrogen phosphate and 14 parts of potassium dihydrogen phosphate in 100 parts of water is added, followed by 100 parts of sodium chloride, and the precipitated dyestuff is filtered off and dried.

The resulting dyestuff analyses for a compound of the formula

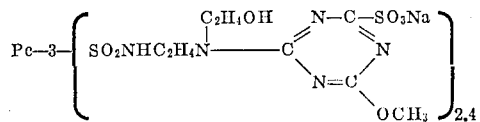

When applied to cellulose textile materials in conjunction with a treatment with an acid-binding agent the dyestuff yields greenish-blue colourations possessing excellent fastness to light and to wet treatments.

The copper phthalocyanine-3-{sulphon - N - [β-(β'-hydroxyethylamino)ethyl]amide}$_{2.4}$ used in the above example was itself obtained by reacting copper phthalocyanine (3-sulphonchloride)$_{2.4}$ with N-(β-hydroxyethyl)ethylenediamine in aqueous medium.

Example 2

In place of the 40.5 parts of copper phthalocyanine 3 - {sulphon - N - [β - (β' - hydroxyethylamino)ethyl]amide}$_{2.4}$ used in Example 1 there are used 38.4 parts of copper phthalocyanine 3-{sulphon - N - [β-(β-hydroxyethylamino)ethyl]amide}$_{3.0}$-3-(sulphonic acid)$_{1.0}$ or 31.0 parts of copper phthalocyanine 3-{sulphon-N-[β-(β'-hydroxyethylamino)ethyl]amide}$_{4.0}$ when similar dyestuffs are obtained.

The starting materials used in this example may themselves be obtained by reacting N-(β-hydroxyethyl)ethylenediamine with copper phthalocyanine tri-3-sulphonchloride mono-3-sulphonic acid and copper phthalocyanine tetra-3-sulphonchloride respectively in aqueous medium.

Example 3

A solution of 7.5 parts of cyanuric chloride in 60 parts of acetone is added to a stirred mixture of 15.6 parts of copper phthalocyanine 3-{sulphon-N-[β-(β'-hydroxyethylamino)ethyl]amide}$_{3.0}$-3-(sulphonic acid)$_{1.0}$, 70 parts of urea and 210 parts of water at 5° C., and the resulting mixture is stirred for 60 minutes at 0° to 5° C. whilst the pH of the mixture is maintained at 6.5 by gradual addition of a 4% aqueous solution of sodium hydroxide. 55 parts of a 4 N aqueous solution of ammonium hydroxide are then added, and the mixture is stirred for 2 hours at 40° to 45° C. The precipitated solid is then filtered off and washed with a 10% aqueous solution of sodium chloride.

The resulting solid is stirred in 200 parts of water, 20 parts of sodium sulphite crystals and 2 parts of pyridine are added, and the mixture is then stirred for 4 hours at 65° C., followed by 1 hour at 85° C. The mixture is then cooled to 20° C., 7 parts of disodium hydrogen phosphate, 14 parts of potassium dihydrogen phosphate and 40 parts of sodium chloride are added, and the precipitated dyestuff is filtered off and dried.

The resulting dyestuff analyses for a compound of the formula:

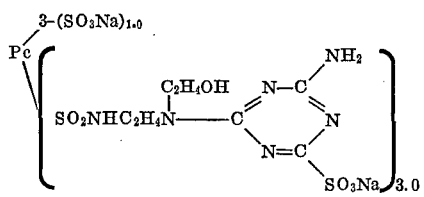

In place of the 15.6 parts of the starting material used in the above example there are used 12.4 parts of copper phthalocyanine - 3 - {sulphon - N - [β-(β'-hydroxyethylamino)ethyl]amide}$_{4.0}$ or 16.5 parts of copper phthalocyanine 3-{sulphon-N-[β-(β' - hydroxyethylamino)ethyl]amide}$_{2.4}$ when similar dyestuffs are obtained.

Example 4

A print paste is prepared comprising:

| | Parts |
|---|---|
| The dyestuff of Example 1 | 3.0 |
| Urea | 20.0 |
| Sodium m-nitrobenzene sulphonate | 1.0 |
| Sodium carbonate | 1.5 |
| 4% aqueous solution of sodium alginate | 35.0 |
| Water | 39.5 |
| | 100 |

The print paste is applied to a woven mercerised cotton fabric by roller printing, and the resulting printed fabric after being dried at 70° C. is treated for 5 minutes at 150° C. in a hot air stove. The printed fabric is then rinsed in water, treated for 2 minutes in a 0.3% aqueous solution of a synthetic detergent at 100° C., rinsed again in water and finally dried. The fabric is thereby printed a bright greenish-blue shade possessing excellent fastness to light and to wet treatments particularly in respect of staining of adjacent white materials.

In place of the 3 parts of the dyestuff of Example 1 which are used in this example there may be used any of the dyestuffs of Examples 2 and 3 when similar results are obtained.

Example 5

In place of the 40.5 parts of copper phthalocyanine 3-{sulphon-N-[β - (β'-hydroxyethylamino)ethyl]amide}$_{2.4}$ used in Example 1 there are used 38.4 parts of copper phthalocyanine 3-{sulphon-N-[β-(β'-hydroxyethylamino)ethyl]amide}$_{3.0}$-3-(sulphonic acid)$_{1.0}$, and in place of the 18.0 parts of 2:4-dichloro-6-methoxy-1:3:5-triazine used in Example 1 there are used (a) 24.2 parts of 2:4-dichloro-6-phenoxy-1:3:5-triazine, or (b) 25.6 parts of 2:4-dichloro-6-p-methylphenoxy-1:3:5-triazine, or (c) 25.6 parts of 2:4-dichloro-6-o-methylphenoxy-1:3:5-triazine, or (d) 27.7 parts of 2:4-dichloro-6-p-chlorophenoxy-1:3:5-triazine, or (e) 20.9 parts of 2:4-dichloro-6-(β-hydroxyethylamino)-1:3:5-triazine, or (f) 24.1 parts of 2:4-dichloro-6-anilino-1:3:5-triazine, whereby the corresponding dyestuffs are obtained wherein X represents a phenoxy, p-methylphenoxy, o-methylphenoxy, p-chlorophenoxy, β-hydroxyethylamino or anilino group.

Example 6

In place of the 55 parts of a 4 N aqueous solution of ammonium hydroxide used in Example 3 there are used the equivalent amounts of a 10% aqueous solution of ethylamino or dimethylamino whereby the corresponding dyestuffs are obtained wherein X represents the ethylamino or dimethylamino group.

Example 7

A solution of 7.5 parts of cyanuric chloride in 60 parts of acetone is added to a stirred mixture of 15.6 parts of copper phthalocyanine 3-{sulphon-N-[β-(β'-hydroxyethylamino)-ethyl]amide}$_{3.0}$-3-(sulphonic acid)$_{1.0}$, 70 parts of urea and 210 parts of water at 5° C. and the resulting mixture is stirred for 60 minutes at 0° to 5° C. whilst the pH of the mixture is maintained at 6.5 by gradual addition of a 4% aqueous solution of sodium hydroxide. 20 parts of sodium chloride are added. The precipitated solid is then filtered off and washed with a 10% aqueous solution of sodium chloride.

The resulting solid is added to 50 parts of urea, 50 parts of water and 40 parts of sodium sulphite crystals and the mixture is then stirred for 4 hours at 50°. The mixture is then cooled to 20° C., 500 parts of water are added, the dyestuff is precipitated by the addition of sodium chloride, and the precipitated dyestuff is filtered off and dried.

The resulting dyestuff analyses for a compound of the formula:

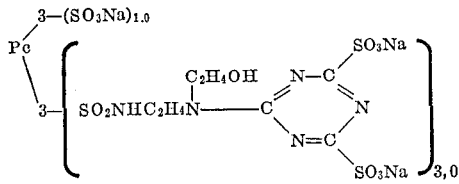

The following table gives further examples of the phthalocyanine dyestuffs of the invention which, in the form of the free acids, have the formula:

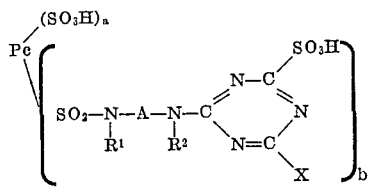

the symbols of which have the values given in the respective columns of the table.

The said dyestuffs may be obtained by methods similar to those described in Examples 1 to 7 by reacting with sodium sulphite the corresponding phthalocyanine dyestuff compounds of Formula I.

I claim:
1. The phthalocyanine dyestuffs which, in the form of the free acids are represented by the formula:

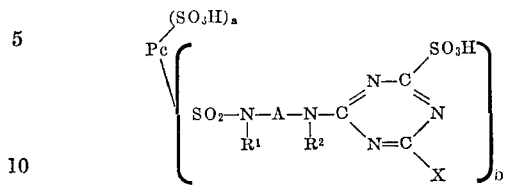

wherein Pc represents a copper phthalocyanine radical;
A represents a lower alkylene radical;
$R^1$ and $R^2$ are each independently selected from the class consisting of hydrogen, lower alkyl and hydroxy lower alkyl;
X is selected from the class consisting of sulphonic acid, lower alkoxy, phenoxy, methylphenoxy, chlorophenoxy, methoxyphenoxy, amino, lower alkylamino, di(lower alkyl)amino, hydroxy lower alkylamino, di(hydroxy lower alkyl)amino and anilino;
$a$ represents a value of from 0 to 2 and
$b$ represents a value of from 1 to 4 provided that the sum of $a$ and $b$ does not exceed 4.

2. The phthalocyanine dyestuffs, as claimed in claim 1, which, in the form of the free acids, are of the formula:

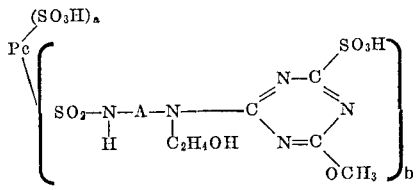

| Example | a | b | A | $R^1$ | $R^2$ | X |
|---|---|---|---|---|---|---|
| 8 | 0 | 4.0 | Ethylene | Hydrogen | β-Hydroxyethyl | Ethylamino. |
| 9 | 0 | 2.4 | do | do | do | Do. |
| 10 | 0 | 4.0 | do | do | do | Dimethylamino. |
| 11 | 0 | 2.4 | do | do | do | Do. |
| 12 | 0 | 2.4 | do | do | Methyl | Methoxy. |
| 13 | 0 | 2.4 | do | do | Ethyl | Do. |
| 14 | 0 | 2.4 | do | Methyl | Methyl | Do. |
| 15 | 0 | 2.4 | do | do | Hydrogen | Do. |
| 16 | 0 | 2.4 | Propylene | do | Hydrogen | Do. |
| 17 | 0 | 2.4 | Ethylene | β-Hydroxyethyl | β-Hydroxyethyl | Do. |
| 18 | 1.0 | 3.0 | do | do | Methyl | Do. |
| 19 | 1.0 | 3.0 | do | do | Ethyl | Do. |
| 20 | 0 | 4.0 | do | do | do | Methoxy. |
| 21 | 0 | 4.0 | do | do | Methyl | Do. |
| 22 | 1.0 | 3.0 | do | do | do | Phenoxy. |
| 23 | 1.0 | 3.0 | do | do | do | p-Methylphenoxy. |
| 24 | 1.0 | 3.0 | do | do | do | o-Methoxyphenoxy. |
| 25 | 1.0 | 3.0 | do | do | do | p-Chlorophenoxy. |
| 26 | 1.0 | 3.0 | do | do | do | β-Hydroxyethylamino. |
| 27 | 1.0 | 3.0 | do | do | do | Anilino. |
| 28 | 1.0 | 3.0 | do | do | Ethyl | Phenoxy. |
| 29 | 1.0 | 3.0 | do | do | do | p-Methylphenoxy. |
| 30 | 1.0 | 3.0 | do | do | do | p-Methoxyphenoxy. |
| 31 | 1.0 | 3.0 | do | do | do | o-Chlorophenoxy. |
| 32 | 1.0 | 3.0 | do | do | do | Di(β-hydroxyethyl)-amino. |
| 33 | 1.0 | 3.0 | do | do | do | Anilino. |
| 34 | 1.0 | 3.0 | do | do | β-Hydroxyethyl | —SO₃H |
| 35 | 1.0 | 3.0 | do | do | Methyl | —SO₃H |
| 36 | 1.0 | 3.0 | do | do | Ethyl | —SO₃H |

Example 37

In place of the copper phthalocyanine 3-{sulphon-N-[β-(β-hydroxyethylamino)-ethyl]amide} compounds used in the previous examples there are used equivalent amounts of copper phthalocyanine 4-{sulphon-N-[β-(β-hydroxyethylamino) - ethyl]amide}₃.₀-(sulphonic acid)₁.₀ or copper phthalocyanine 3:4′:4″:4‴-{sulphon-N-[β-(β-hydroxyethylamino) - ethyl]amide}₃.₀-(sulphonic acid)₁.₀ whereby similar dyestuffs are obtained.

These phthalocyanine compounds can themselves be obtained by reacting copper phthalocyanine 4-trisulphonchloride monosulphonic acid or copper phthalocyanine-3:4′:4″:4‴ - trisulphonchloride monosulphonic acid respectively with N - (β-hydroxyethyl)ethylenediamine in aqueous medium.

wherein Pc is a copper phthalocyanine radical;
A is a lower alkylene radical;
$a$ represents a value of from 0 to 2 and $b$ represents a value of from 1 to 4 provided that the sum of $a$ and $b$ does not exceed 4.

References Cited

UNITED STATES PATENTS 3,082,201   3/1963   Koller _____ 260—249.5 XR
3,096,340   7/1963   Tartter et al. ___ 260—249.8 XR
3,133,059   5/1964   Clark et al. ____ 260—249.5 XR HENRY R. JILES, *Primary Examiner.*

J. M. FORD, *Assistant Examiner.*